Patented Oct. 27, 1925.

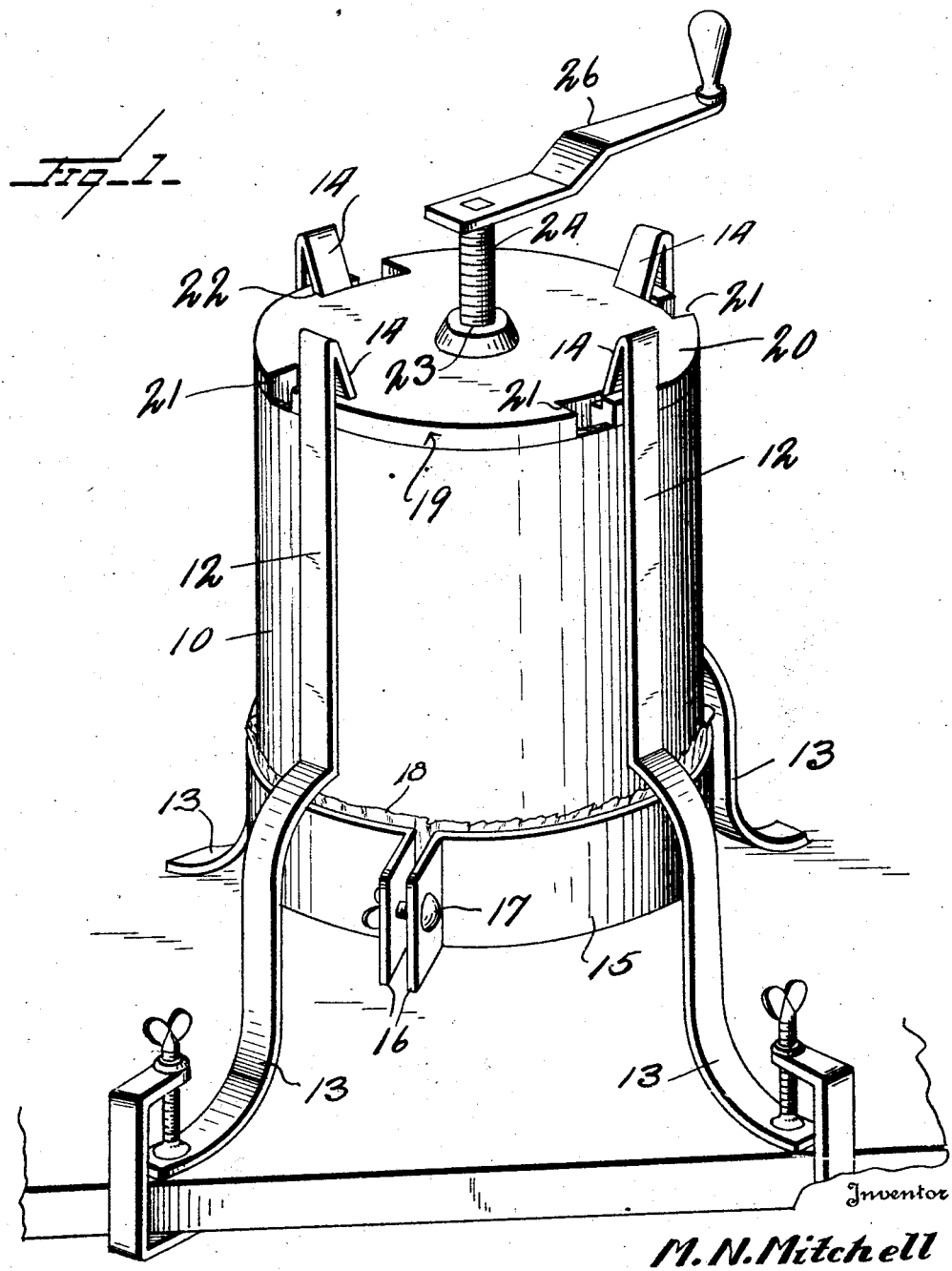

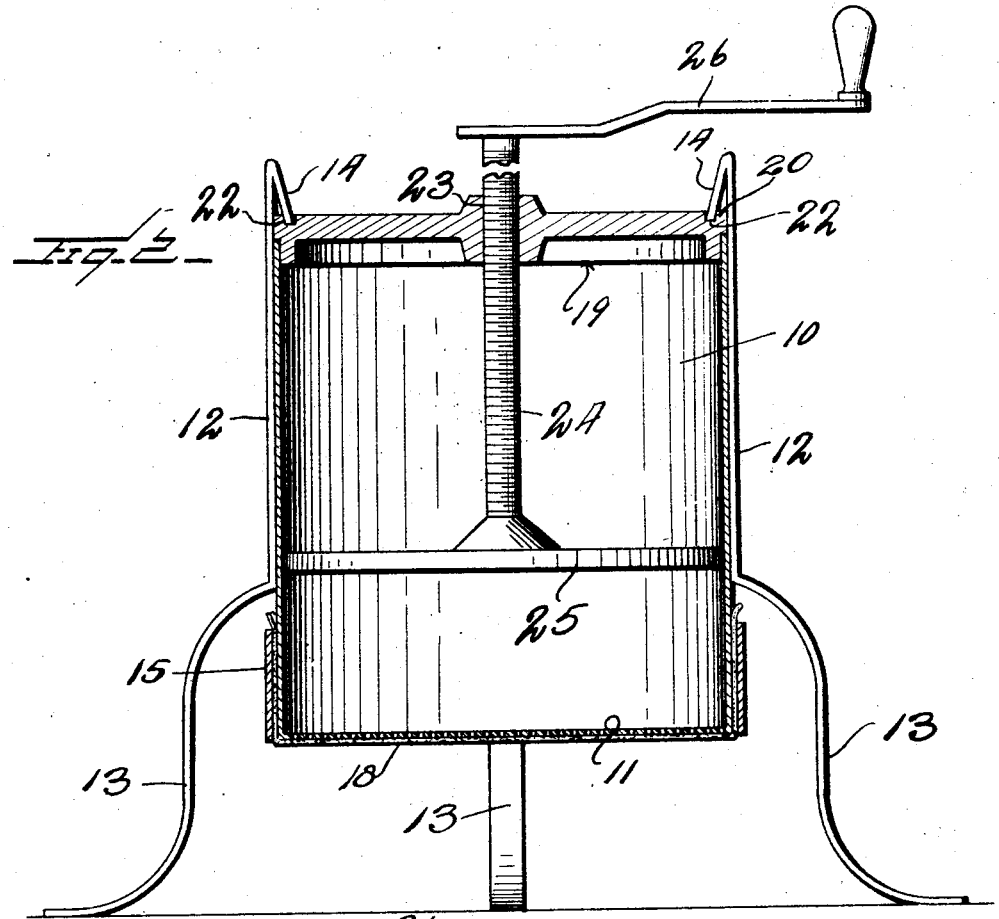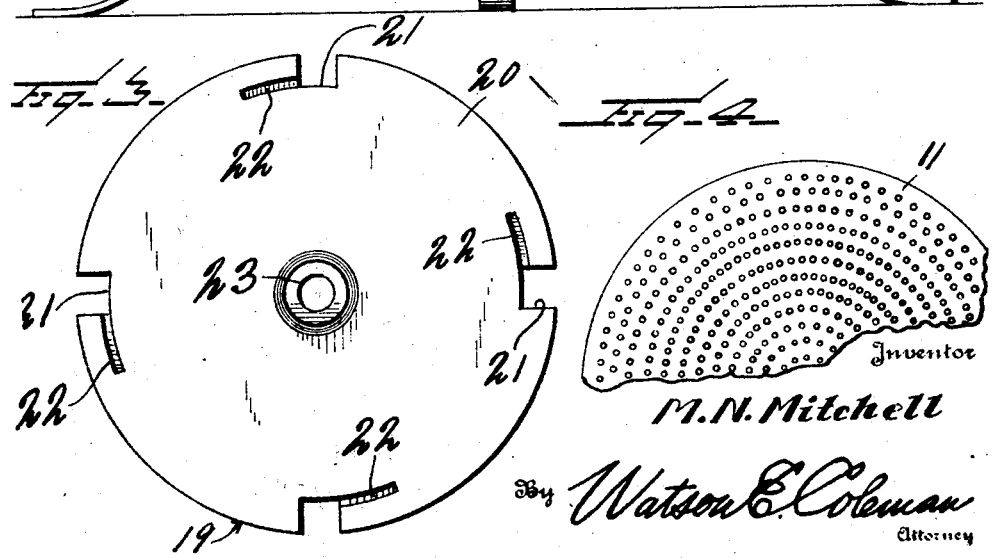

1,558,995

UNITED STATES PATENT OFFICE.

MAY NOEL MITCHELL, OF NEW ROCKFORD, NORTH DAKOTA.

COMBINATION JELLY STRAINER AND FRUIT PRESS.

Application filed April 21, 1924. Serial No. 708,071.

To all whom it may concern:

Be it known that I, MAY NOEL MITCHELL, a citizen of the United States, residing at New Rockford, in the county of Eddy and State of North Dakota, have invented a new and useful Combination Jelly Strainer and Fruit Press, of which the following is a specification.

This invention relates to pressing and straining devices, and particularly to means used for pressing fruit and straining the juice therefrom.

One of the objects of the invention is to provide a practical and efficient straining device which is simple in construction and in operation, durable and convenient, and which will do away with the necessity of using the ordinary jelly bag for the purpose of expressing fruit juices.

A further object is to provide a device of this character which may be used as a fruit press so that cooked fruit, after the juice for jelly has been strained off, may have the edible portions of the mass expressed, leaving the inedible portions within the container of the device, the edible portion of the fruit thus pressed out being used for the making of jams, marmalade, fruit butter, etc.

A still further object is to provide a device of this character which includes a container perforated at the bottom and having an expressing or pressing piston operating therein, and provide in connection with the container means for supporting across the bottom of the container a piece of textile fabric which will act as a strainer.

Another object is to provide a cover mounted upon the upper end of the container, and provide means for detachably holding and locking the cover in place, this cover having an aperture for the passage of the expressing piston shaft.

Still another object is to provide a device of this character which is readily separated so as to permit the device to be thoroughly cleaned and kept in a sanitary condition.

My invention is illustrated in the accompanying drawings, wherein:—

Figure 1 is a perspective view of an expressing device constructed in accordance with my invention Figure 2 is a vertical sectional view of an expressing device;

Figure 3 is a top plan view of the cover of the expressing device;

Figure 4 is a fragmentary plan view of the bottom of the expressing device.

Referring to these drawings, 10 designates a cylindrical container which may be made of glass, pottery, aluminum or any other material which will not deleteriously affect fruit juices and which may be kept in a thoroughly sanitary condition. This container 10 is formed with a perforated bottom 11 having perforations set very close together and relatively small but is open at the top and is, as before stated, uniformly cylindrical in form so that it may be readily cleansed. This container 10 is supported by a plurality of supporting strips 12. These strips extend down flat against the outside face of the container for a distance somewhat above the lower edge of the container and then extend outward and downward so as to form legs 13 which support the container in spaced relation to the table. The upper ends of these strips 12 extend above the top edge of the container 10 and at their upper ends are downwardly and inwardly extended, as at 14, for a purpose to be later stated. Any means may be used for holding the strips 12 to the container and, of course, if the container is of metal these strips may be readily soldered thereto.

Disposed around the lower end of the container 10 is a band 15 of metal, the extremities of this band being outwardly flanged, as at 16, and passing through the band is a clamping bolt 17. This band is for the purpose of holding in place a piece of textile fabric 18, such as cheesecloth or the like, this fabric being disposed beneath the lower end of the container 10 and having its margins brought up around the container and being held in place by the band 15. Thus when it is desired to strain or express fruit juices, this screen of textile fabric is disposed upon the lower end of the container. When it is desired to express the pulp, then this textile fabric is not used.

The upper end of the container 10 is closed by means of a cover 19. This cover has a portion which fits down snugly within the wall of the container and a portion 20 which extends outward so as to fit over the upper edge of the wall. This portion 20 at intervals is recessed, as at 21, this recess having laterally extending grooves 22. All of the lateral extensions of the recesses 21 extend in the same direction. The central portion of the cover is formed with a screw-threaded opening 23, and operating through this screw-threaded opening is a screw shaft 24, the lower end of which carries a piston 25 which, of course, fits within the container 10. The upper end of this screw shaft passes through the screw-threaded aperture 23 and at its upper end the shaft is provided with a crank handle 26. Preferably the middle portion of the cover is thickened so as to provide sufficient screw-threads for the screw 24.

In the use of this device, when it is desired to express and strain juices from fruit, the fruit is disposed within the container 10, when the piston 25 is, of course, raised to its full extent. Then the handle 26 is turned while the piston moves gradually downward, compressing and mashing the fruit and expressing the juices. Under these circumstances the square of textile fabric is disposed beneath the perforated bottom 11 and held in place by the band 15 and thus the juice is strained in the same manner that the juice would be strained by the ordinary jelly bag, the juice thereby being made fit for making jellies and the like. After the juice has been expressed, the fabric may be removed by loosening the band 15 and then the pulp is expressed through the perforations in the bottom 11, this pulp being used for marmalade, jam, fruit butter, etc., and the device acting to separate the edible fruit pulp from the inedible portions, that is skin, core, tissue, seeds, etc., which are retained within the container 10.

It will be seen that the upward strain on the screw 24 is borne by the threaded aperture 23 and thus by the cover and, therefore, it is necessary that the cover should be locked down securely and firmly upon the container 10, and to this end it is that I have provided the upper end of the strips 12 with the downwardly and inwardly extending, angularly bent portions 14. After the lid is placed in proper position with the upper ends or clamping ends of the four strips 12 in the four notches 21, the lid is turned to allow the projecting edge of each clamp to enter the corresponding groove 22 thus securely locking the lid to the container and preventing any upward movement of the lid and transmitting the strain downward along the whole length of the strip 12. The strip 12 being long prevents this strain from tending to break off or force off these strips or in other words forcing or breaking the lock which holds the lid in place. It will be seen that there is very little strain placed upon the cloth 14 when the juice is being expressed from the device for the reason that the perforated bottom supports the crushing pressure applied to the fruit and thus the squares of cloth used will last a long while and there will be no danger of their breaking or tearing under strain.

It will be seen that the cover with the screw may be readily removed from inside the container, that the container being rounded with a mere perforated bottom may be readily cleaned. The band or collar 15 may also be removed when desired in order to clean the same, but ordinarily it will be kept on the container itself. In pressing pulp, the lower ends of the legs 13 or feet, as they may be termed, will be clamped upon a table top as, for instance, by clamps engaging two of the feet so that the device will be held firmly against any tendency to rotate or move about as the crank handle 26 is turned.

While I have illustrated certain details of construction and arrangement of parts, I do not wish to be limited to these as it is obvious that minor changes might be made without departing from the spirit of the invention as defined in the appended claims.

I claim:—

1. A fruit expressing device of the character described comprising a cylindrical container having a perforated bottom, a cover having a screw-threaded central opening, a threaded shaft passing through the opening and carrying a piston it its lower end and a handle at the upper end of the shaft, and means for locking the cover in place upon the container comprising strips attached to the side wall of the container and extending above the same, the upper ends of the strips being downwardly and inwardly extended, the margin of the cover being provided with recesses to initially receive said inwardly bent ends of the strips whereby the cover may be placed within the strips and then shifted to cause the cover to shift into position beneath the downwardly and inwardly extending portions of the strips.

2. A fruit expressing device of the character described comprising a cylindrical container having a perforated bottom, a cover having a screw-threaded central opening, a threaded shaft passing through the opening and carrying a piston at its lower end and a handle at the upper end of the shaft, and means for locking the cover in place upon the container comprising strips attached to the side wall of the container and extending above the same, the upper ends of the strips being downwardly and inwardly extended, the margin of the cover being provided with recesses to receive initially said inwardly bent ends of the strips whereby the cover may be placed on the container and then rotatably shifted to cause the cover to shift into position beneath the lower ends of the turned-over portions of the strips, the upper face of the cover being provided with grooves within which said strips engage when the cover has been fully shifted in one direction.

3. A fruit expressing device of the character described comprising a cylindrical container having a perforated bottom, means embracing the bottom for holding a strip of textile fabric over the bottom, a plurality of vertically extending strips attached to the casing and extending from a point above the top thereof downward nearly to the bottom thereof and then extending outward and laterally to form legs, the upper ends of said strips being downwardly and inwardly bent, a cover having a central screw-threaded opening, a piston having a screw engaging said opening, the margin of the cover being recessed to permit the cover to be slipped over said inwardly turned ends of the strips and the upper face of the cover being formed with grooves to receive the extremities of the inwardly turned ends of the strips.

MAY NOEL MITCHELL.